US009350964B2

(12) United States Patent
Wu

(10) Patent No.: US 9,350,964 B2
(45) Date of Patent: May 24, 2016

(54) BARREL-BASED WHITE BALANCE FILTER

(71) Applicant: Fu-Chi Wu, Northridge, CA (US)

(72) Inventor: Fu-Chi Wu, Northridge, CA (US)

(*) Notice: Subject to any disclaimer, the term of this patent is extended or adjusted under 35 U.S.C. 154(b) by 115 days.

(21) Appl. No.: 14/224,219

(22) Filed: Mar. 25, 2014

(65) Prior Publication Data
US 2015/0281665 A1 Oct. 1, 2015

(51) Int. Cl.
H04N 5/225 (2006.01)
H04N 9/73 (2006.01)

(52) U.S. Cl.
CPC ............. H04N 9/735 (2013.01); H04N 5/2254 (2013.01)

(58) Field of Classification Search
None
See application file for complete search history.

(56) References Cited

U.S. PATENT DOCUMENTS

| 5,208,624 | A | * | 5/1993 | MacKay | ........................ 396/544 |
| 8,073,324 | B2 | * | 12/2011 | Tsai | ............................... 396/544 |
| 2009/0086101 | A1 | * | 4/2009 | Lee | ................................ 348/655 |
| 2011/0026916 | A1 | * | 2/2011 | Neiman | ........................ 396/533 |
| 2015/0116535 | A1 | * | 4/2015 | Wu et al. | ..................... 348/224.1 |

* cited by examiner

Primary Examiner — Lin Ye
Assistant Examiner — Euel Cowan
(74) Attorney, Agent, or Firm — Rosenberg, Klein & Lee

(57) ABSTRACT

A barrel-based white balance filter includes an opaque barrel attachable to a camera lens of a camera and a white balance component in the form of a milky white or gray filter having a milky white or gray annular rim and axially adjustably mounted in the opaque barrel so that the milky white or gray annular rim is protected by the opaque barrel against the radiation of vivid light or reflected light during a manual white balance operation when the white balance component is completely received in the opaque outer barrel, enabling the manual white balance system of the camera to measure the average white balance value of the viewing scene accurately.

7 Claims, 14 Drawing Sheets

BARREL-BASED WHITE BALANCE FILTER

BACKGROUND OF THE INVENTION

1. Field of the Invention

The present invention relates to image pick-up technology, and more particularly, to a barrel-based white balance filter, which comprises an opaque barrel, and a white balance component axially adjustably mounted in the opaque barrel. The invention uses the opaque barrel to isolate the color temperature beyond the viewing scene, and allows adjustment of the proportion of the amount of the color temperature of the main light source using the light transmissive property of the white balance filter of the white balance unit, achieving the effect of increasing or reducing the average color temperature like the functioning of the eyelid to adjust the intraocular pressure subject to the brightness of the main light source so that the color is closer to the human eye visual sense and personal preferences.

2. Description of the Related Art

White balance filter plate (7) or white balance lens cap (6) with a filter (61) may be used with a camera (2). During application, as illustrated in FIGS. 13, 14 and 15, the white balance filter plate (7) or white balance lens cap (6) is attached to the camera lens (21) of the camera (2), and then the shutter is pressed to run the manual white balance mode, getting the average white balance value of the viewing scene. This average white balance value is used as a single color temperature for photographing.

Red, blue and green are three most basic colors that can be combined to make a useful range of colors. For human applications, these three primary colors are usually used, since human color vision is trichromatic. Only the values of these three primary colors are equal to each other, R=B=G, the correct white can be presented in the human vision. If white is accurately corrected or displayed, all other colors of photos or videos can be presented correctly in the human vision.

The manual white balance mode of a camera is to accurately measure the average color temperature of the viewing scene for use as a color temperature reference value so that accurate colors can be exhibited in the artworks, greatly reducing further software color temperature revising works. Because the colors of photos or videos having an incorrect color temperature are inconsistent with the scene of the photography site, the high-precision human visual system can easily senses the differences, all camera artworks in incorrect color are failed artworks to all people.

Each single picture of photos, videos, or live videos is presented in the human vision based on a single color temperature. The human vision can instantly senses any change or error of the color temperature. Therefore, getting the color temperature value of the scene is one of the most important works of the success of the artwork.

However, attaching a conventional white balance filter plate (7) or white balance lens cap (6) for a manual white balance operation cannot accurately get the color temperature and colors of the photography scene due to poor overall design of the white balance filter plate (7) or white balance lens cap (6). When facing the white balance filter plate (7) or white balance lens cap (6) toward the viewing scene, all the surrounding lights and colors non-selectively fall upon the filter to make an incorrect average color temperature value.

Actually, every color of a physical object has its particular color temperature value under every light source. When changing the shooting direction of the camera during photographing, the composition of the photograph range and color ratio are relatively changed, and the average color temperature value of each picture is also changed. So, only focus on the area of the scene to be photographed can get the most precise average white balance value.

In an outdoor operation, the scene taken by the camera (2) depends upon the view angle and distance of the focus of the camera lens (21). Photographing has its scene range. During application of the white balance filter plate (7) or white balance lens cap (6), unnecessary ambient light beyond the viewed range will be received, such as sunlight, reflected light from the blue sky and white clouds can fall upon the white balance filter plate (7) or white balance lens cap (6) to mix with the incident light from the viewing scene, causing the camera (2) to get an incorrect average color temperature value for photographing. Based on this incorrect average color temperature value, a color shift problem will occur in the photos or videos thus obtained.

During an indoor photography operation, all the outdoor or indoor main light source and other ambient and reflected light rays and colors from all directions will fall upon the white balance filter plate (7) or the filter (61) of the white balance lens cap (6) and enter the color temperature sensing range of the light transmissive structure thereof, giving an incorrect average white balance value to the manual white balance system, resulting in photo color distortion.

In addition to general photography purposes, getting the accurate colors of objects is also very important in scientific research, color management, typography or recording works, for example, to obtain a reference color of an object at different locations or under different light source environments for color calibration to achieve consistency.

SUMMARY OF THE INVENTION

The present invention has been accomplished under the circumstances in view. It is therefore the main object of the present invention to provide a measure capable of getting the correct average white balance in a simple, rapid and low-cost manner. A barrel-based white balance filter of the present invention comprises a white balance unit that comprises a barrel and a white balance component axially adjustably mounted in the barrel. The barrel is prepared from an opaque material and attachable to a camera lens of a camera directly or by means of an engagement thread thereof. The white balance component is a milky white or gray filter having a milky white or gray annular rim axially extended from the periphery thereof, and mounted in the barrel and axially movable relative to the barrel between an extended position and a fully received position. Thus, adjusting the position of the white balance component relative to the opaque barrel causes change in the received color light gradually. When the white balance component is moved to the position where the annular rim suspends outside the opaque barrel, the amount of ambient color light received by the milky white or gray filter is greatly increased, and the surrounding color light beyond the viewing scene that falls upon the annular rim is guided into the milky white or gray filter to regulate the color temperature value.

Further, when the white balance component is in the fully received position, the milky white or gray annular rim is completely received in the barrel and protected by the opaque barrel against the radiation of vivid light or reflected light during a manual white balance operation, enabling a manual white balance system of the camera using the barrel-based white balance filter to measure the average white balance value of the viewing scene accurately.

Further, by means of the high precision white balance filter, the barrel-based white balance filter of the present invention can accurately measure the color temperature value accurately from a far distance for adjusting the color balance and color density, achieving perfect color temperature setting in JPG or RAW files so that the user can instantly upload perfect color photos for sharing.

Further, the design of the barrel of the barrel-based white balance filter facilitates convenient use. When using the manual white balance mode, the barrel-based white balance filter can be directly attached to the camera lens, preventing intake of vivid light and color beyond the viewing range to affect color temperature measuring accuracy.

DETAILED DESCRIPTION OF THE PREFERRED EMBODIMENT

Figure 1:
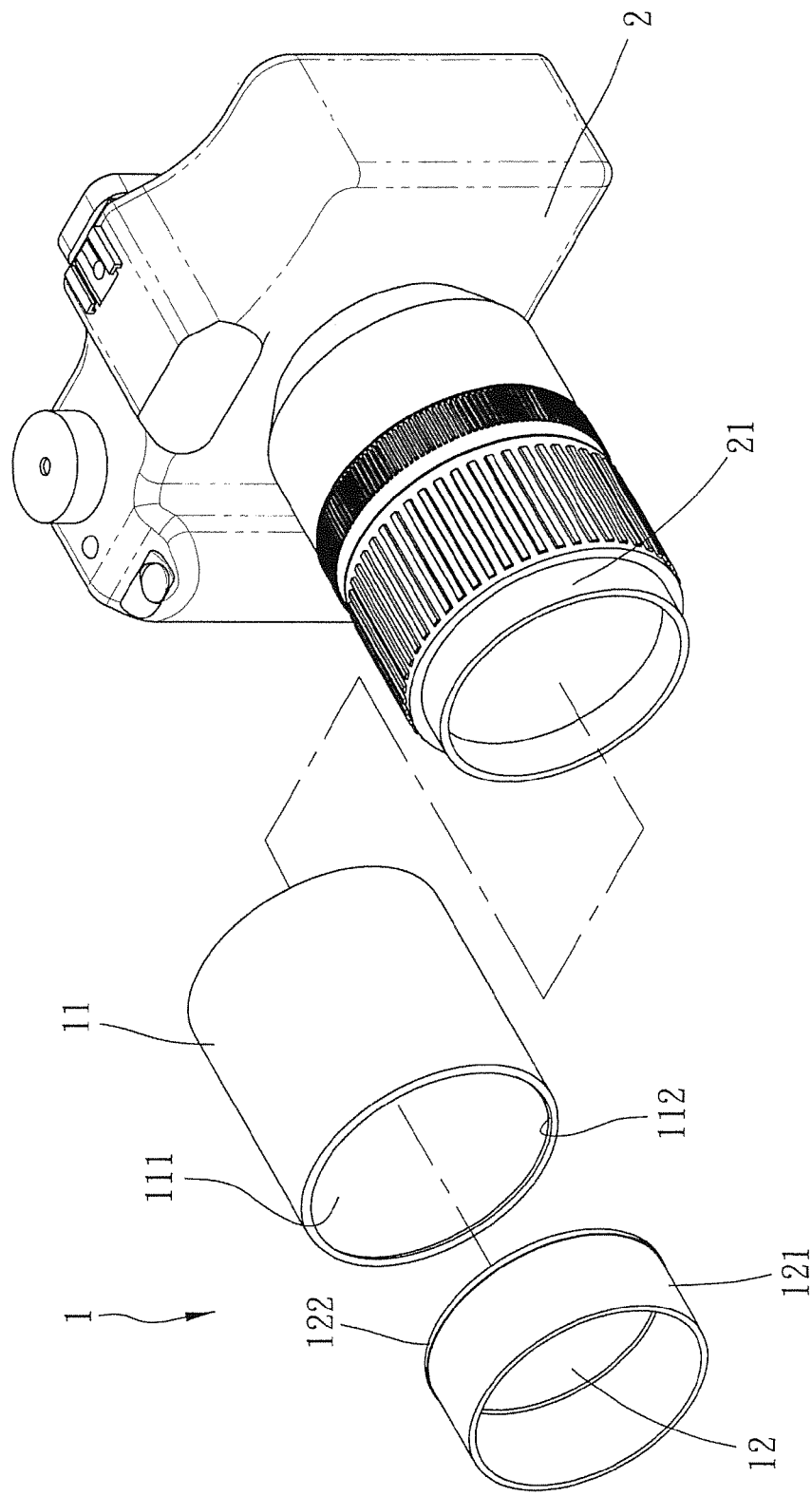
FIG. 1 is an exploded view of a barrel-based white balance filter in accordance with a first embodiment of the present invention.
Figure 2:
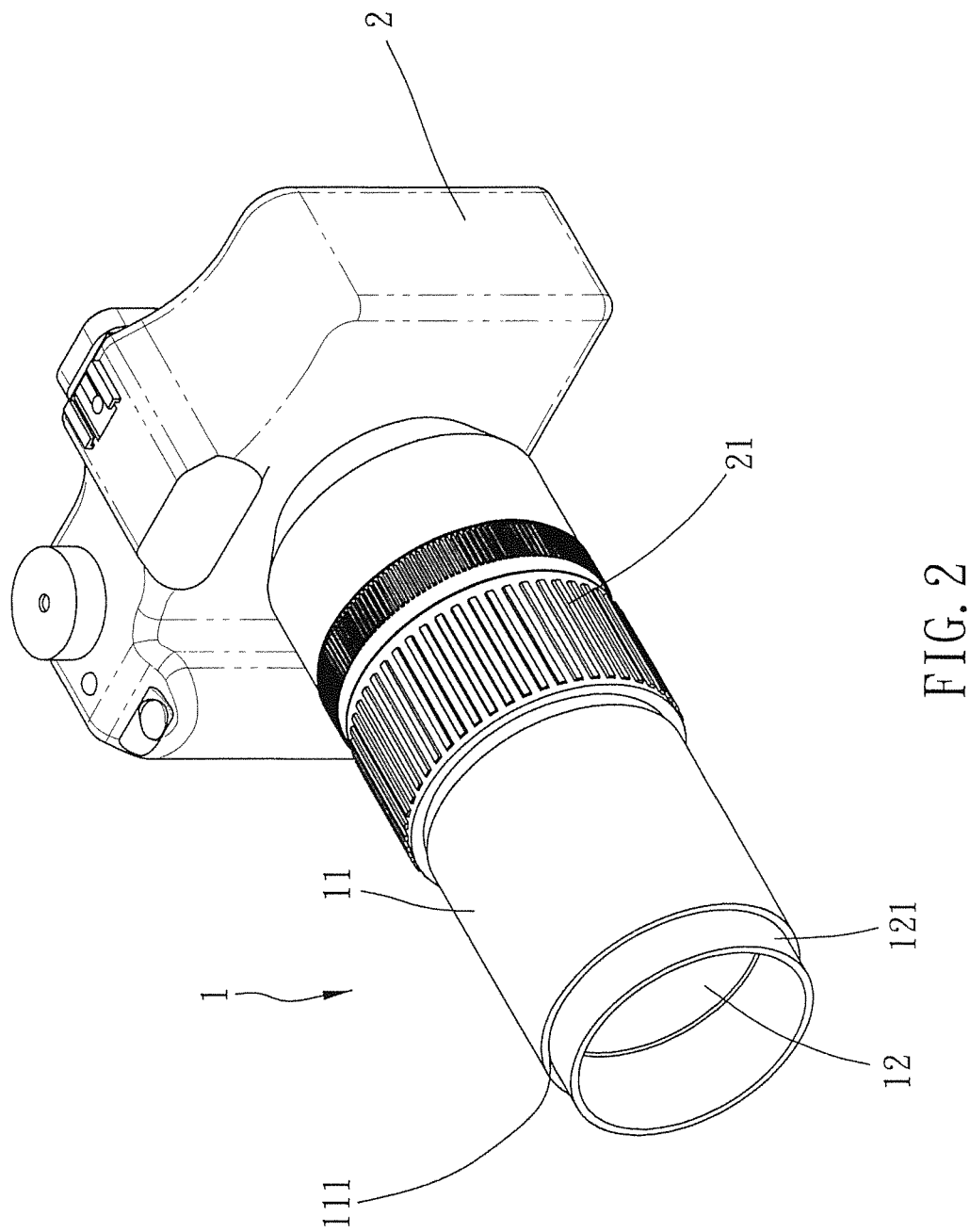
FIG. 2 illustrates the barrel-based white balance filter of the first embodiment of the present invention attached to the camera lens of a camera.
Figure 3:
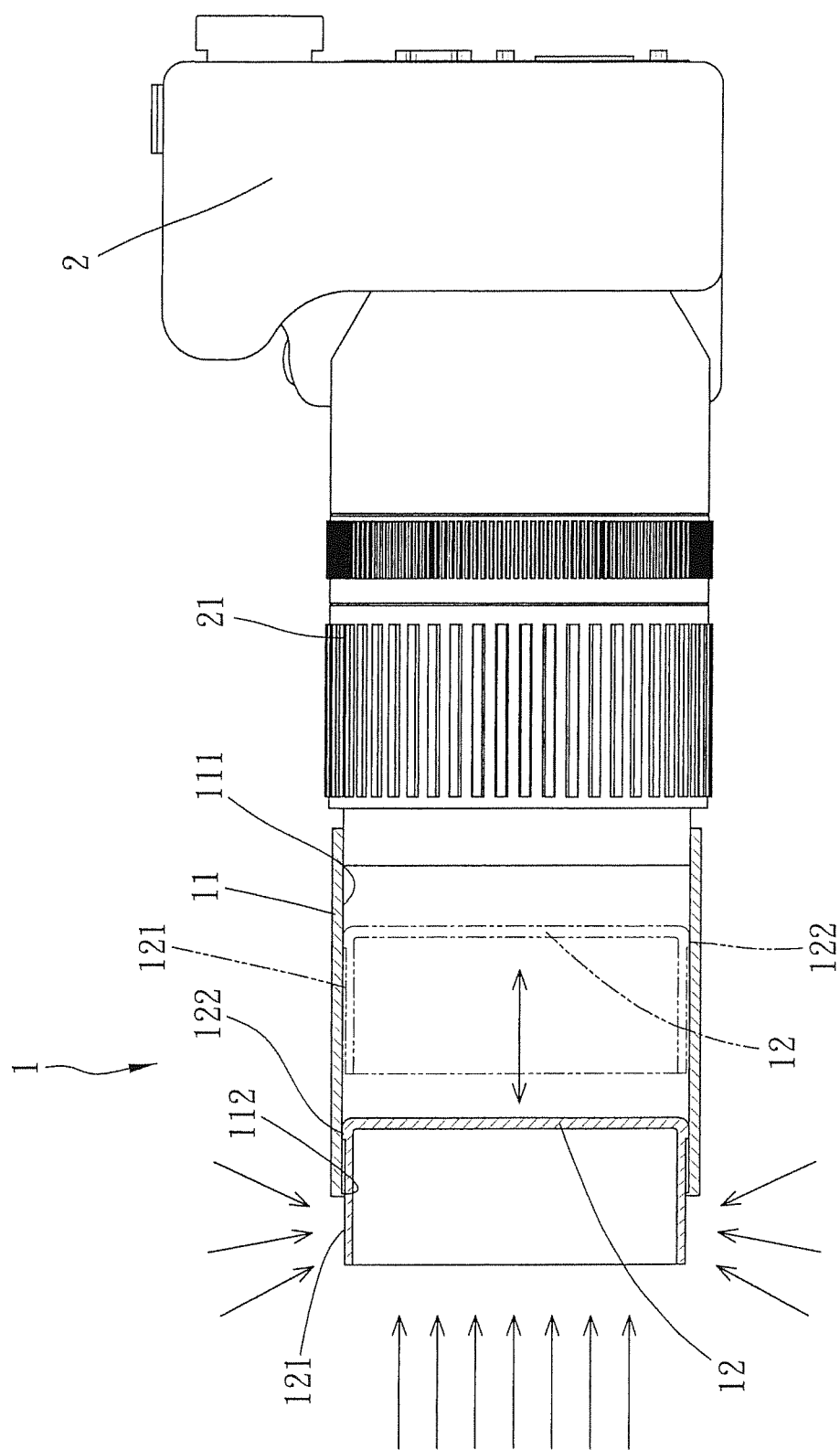
FIG. 3 is a schematic sectional applied view of the first embodiment of the present invention, illustrating the white balance filter adjusted relative to the opaque barrel.
Figure 4:
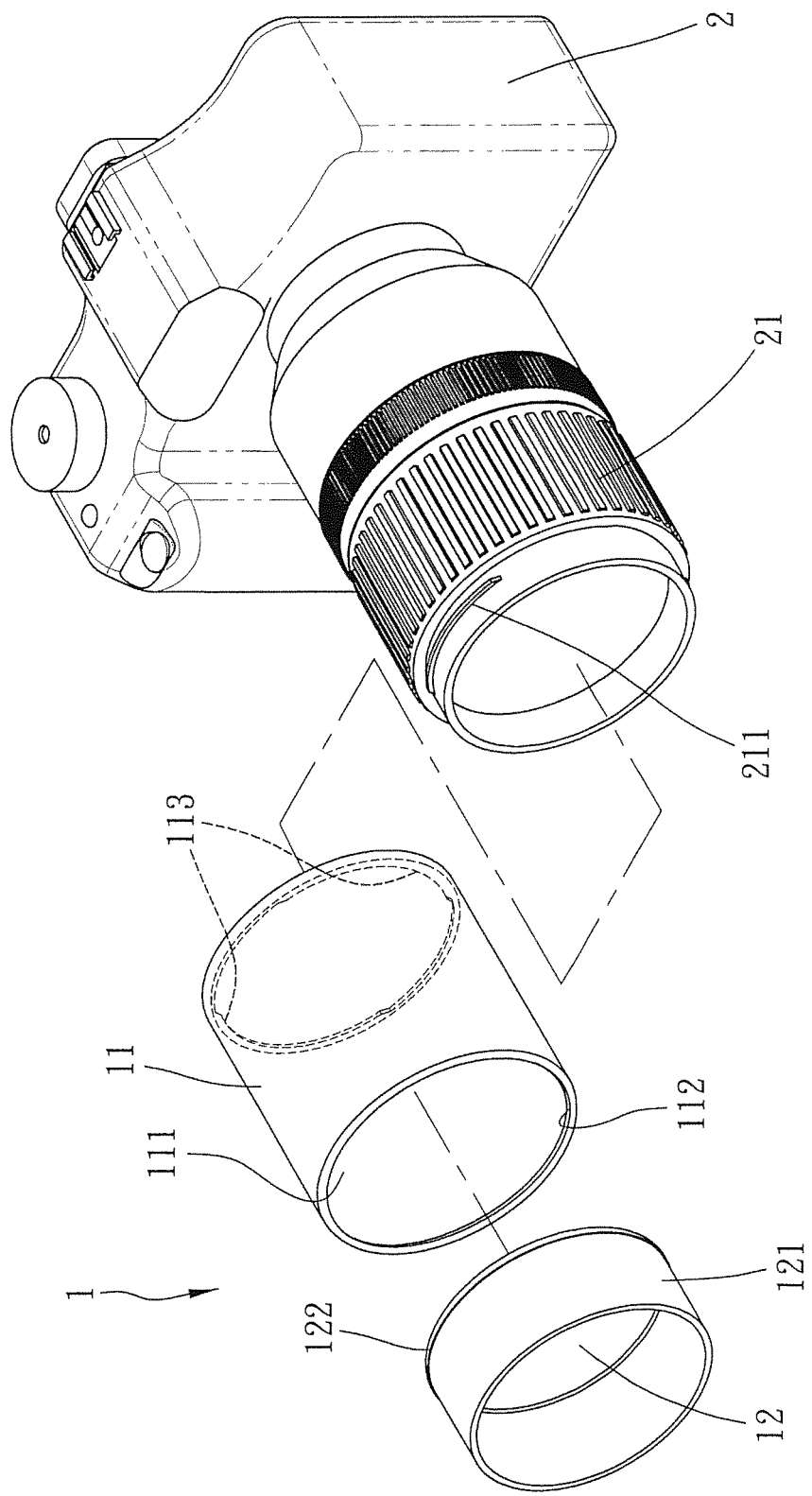
FIG. 4 is an exploded view of an alternate form of the first embodiment of the present invention, illustrating the opaque barrel provided with an engagement thread for engagement with an engagement groove around the periphery of a front end of a camera lens of a camera.
Figure 5:
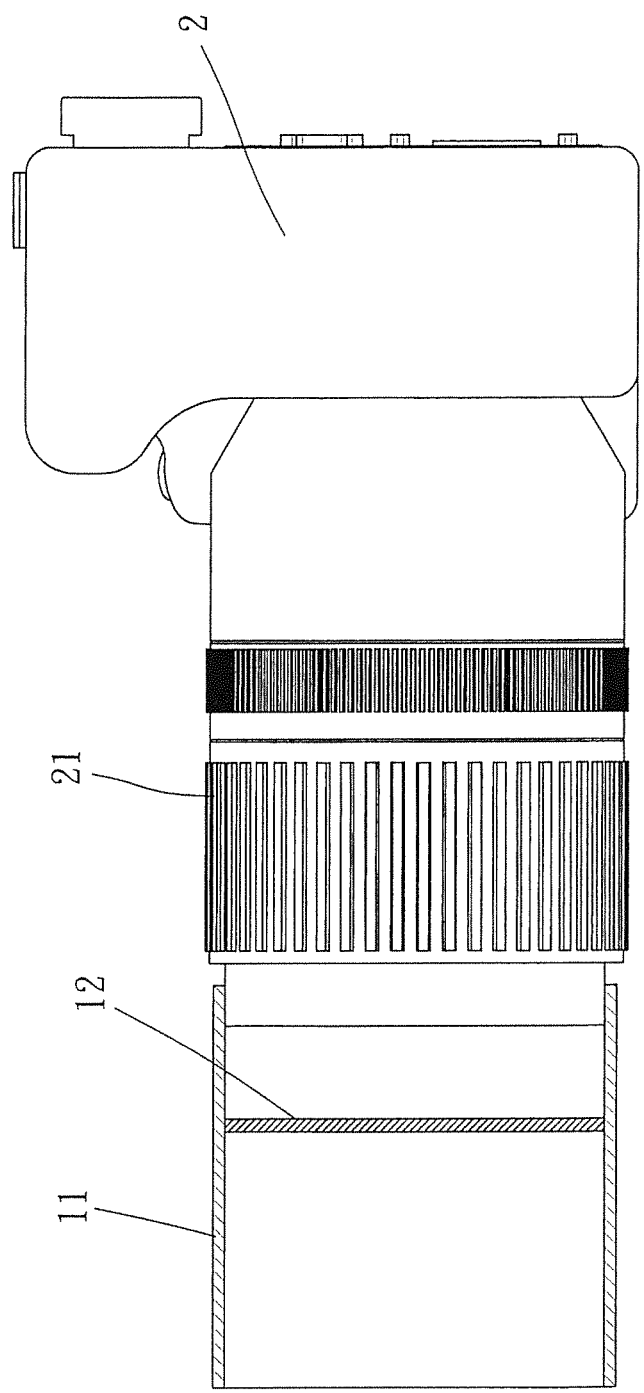
FIG. 5 is a sectional installed view of an alternate form of the first embodiment of the present invention, illustrating the use of a flat glass type white balance filter.

Referring to FIGS. 1, 2 and 3, a barrel-based white balance filter in accordance with a first embodiment of the present invention is shown. The barrel-based white balance filter comprises a white balance unit (1) that comprises a barrel (11) and a white balance component axially adjustably mounted in the barrel (11). The barrel (11) is made from an opaque material, and configured to be directly press-fitted onto the lens (21) of a camera (2). Alternatively, the barrel (11) can be configured to provide an engagement thread (113) for engagement with an engagement groove (211) around the periphery of the front end of the camera (2) (see FIG. 4). The white balance component is a milky white or gray filter (12) having an annular rim (121) axially extended from the periphery thereof and insertable into the bore (111) in the barrel (11) for allowing adjustment of the position of the milky white or gray filter (12) relative to the barrel (11) in axial direction. When pushed the milky white or gray filter (12) to the position where the annular rim (121) is completely received in the bore (111) of the barrel (11), the milky white or gray filter (12) is received in and shielded by the opaque barrel (11). Thus, during the operation of the camera (2) under the manual white balance mode, the milky white or gray filter (12) is well protective by the opaque barrel (11) against the radiation of vivid light or reflective light, and thus, the manual white balance system of the camera (2) can measure the average white balance value of the viewing area accurately. Further, the milky white or gray filter (12) can be configured having a six-star sword head protrusion at the center to assist focusing of the lens (21). Further, the closer the position of the milky white or gray filter (12) to the bore (111) of the barrel (11) is, the larger the amount of color light received will be. Adjusting the position of the milky white or gray filter (12) relative to the barrel (11) causes change in the received color light gradually. When the milky white or gray filter (12) is moved axially toward the outside of the bore (111) of the barrel (11) to have the annular rim (121) suspend outside the bore (111) of the barrel (11), the amount of ambient color light received by the milky white or gray filter (12) is greatly increased, and the surrounding color light beyond the scene of the viewing window that falls upon the annular rim (121) outside the bore (111) of the barrel (11) is guided into the milky white or gray filter (12) to regulate the color temperature value. Further, stop flanges (122)(112) are respectively provided at the rear side of the milky white or gray filter (12) and the orifice of the bore (111) of the barrel (11) for stopping against each other to prohibit the milky white or gray filter (12) from falling out of the barrel (11). Further, the milky white or gray filter (12) can be made a flat glass filter mounted in the bore (111) of the barrel (11) for receiving the color light of the scene viewed through the viewing window of the camera (2), obtaining an accurate average white balance value (see FIG. 5).

Figure 6:
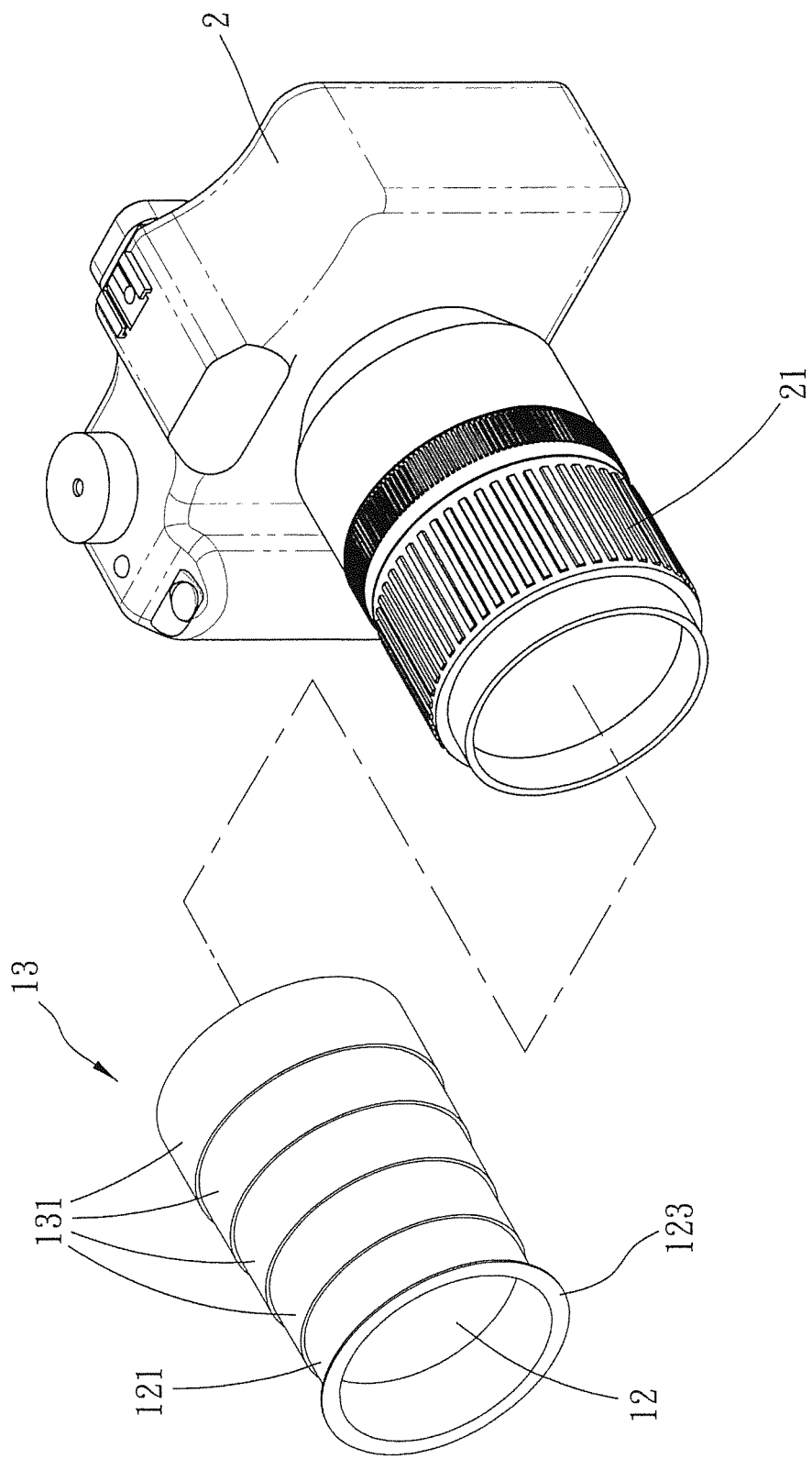
FIG. 6 is a sectional installed view of a barrel-based white balance filter with a telescopic barrel in accordance with a second embodiment of the present invention.
Figure 7:
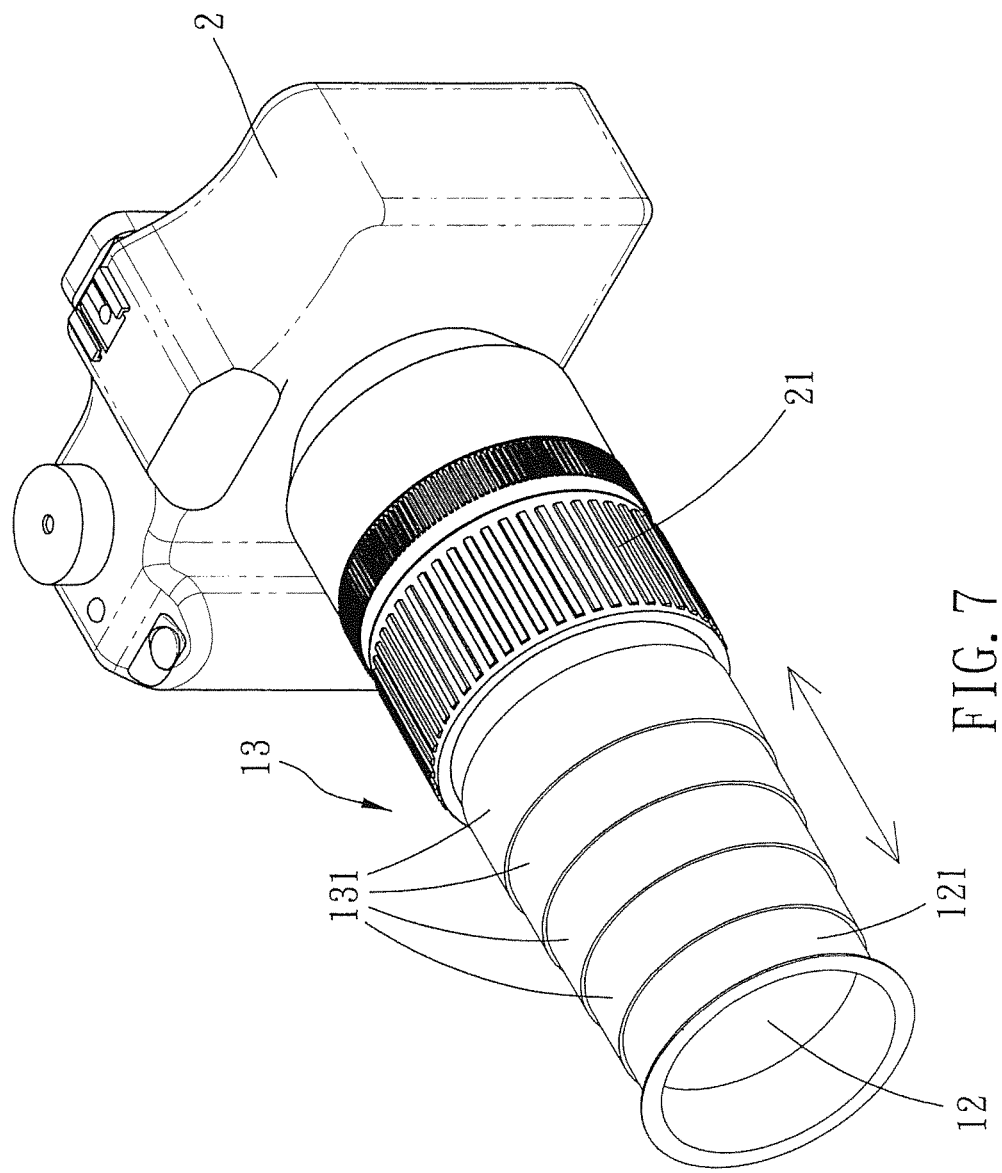
FIG. 7 corresponds to FIG. 6, illustrating the telescopic barrel of the barrel-based white balance filter fastened to a camera lens of a camera.
Figure 8:
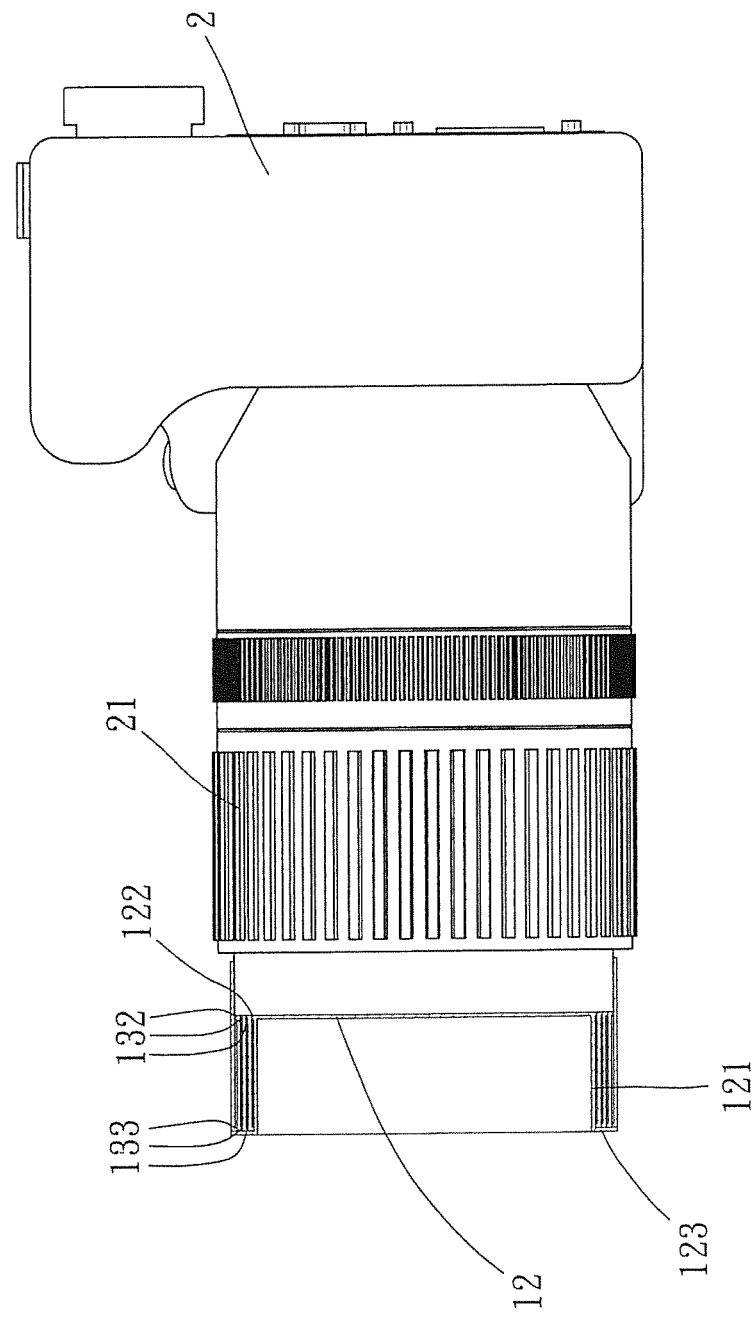
FIG. 8 corresponds to FIG. 7, illustrating the telescopic barrel in the received status.

Referring to FIGS. 6, 7 and 8, a barrel-based white balance filter in accordance with a second embodiment of the present invention is shown. In this second embodiment, the barrel (13) is a telescopic design, comprising a plurality of barrel components (131) that slide one inside another. The milky white or gray filter (12) with the annular rim (121) is slidably coupled to the front side of the barrel (13). Thus, the barrel-based white balance filter can be adjusted axially to extend or shorten the length for carrying or storage conveniently. Further, stop flanges (132)(133)(122)(123) are respectively provided at opposing front and rear sides of each of the barrel components (131) and the milky white or gray filter (12) to prohibit the barrel components (131) and the milky white or gray filter (12) from disconnection.

Figure 10:
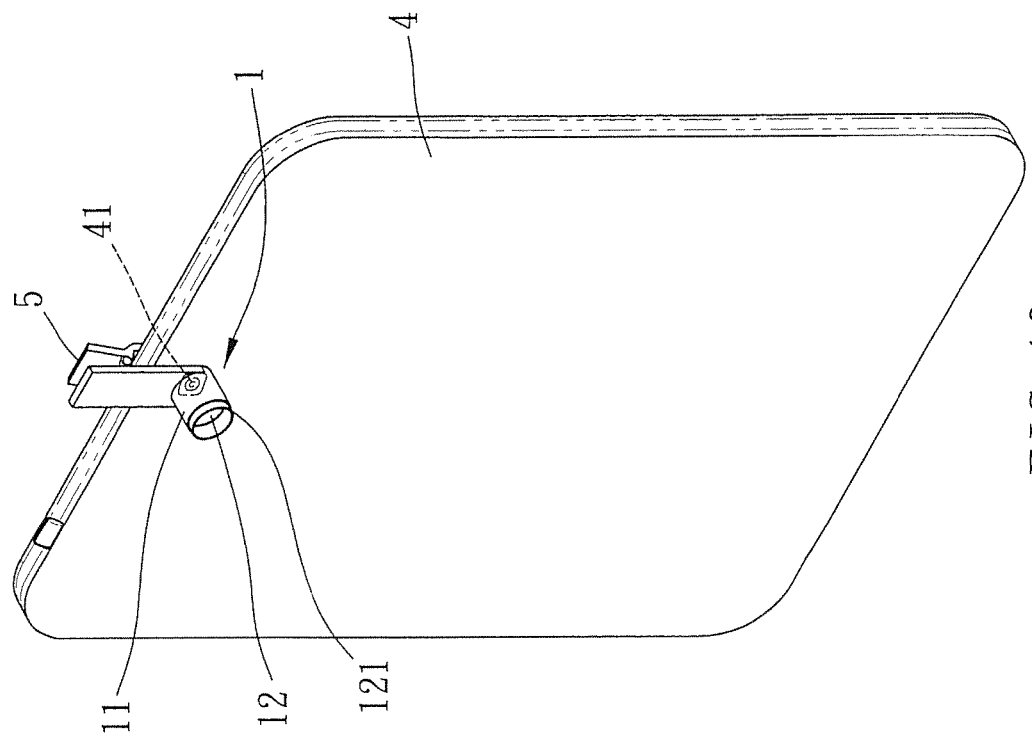
FIG. 10 illustrates the barrel-based white balance filter of the third embodiment of the present invention fastened to a tablet computer.
Figure 9:
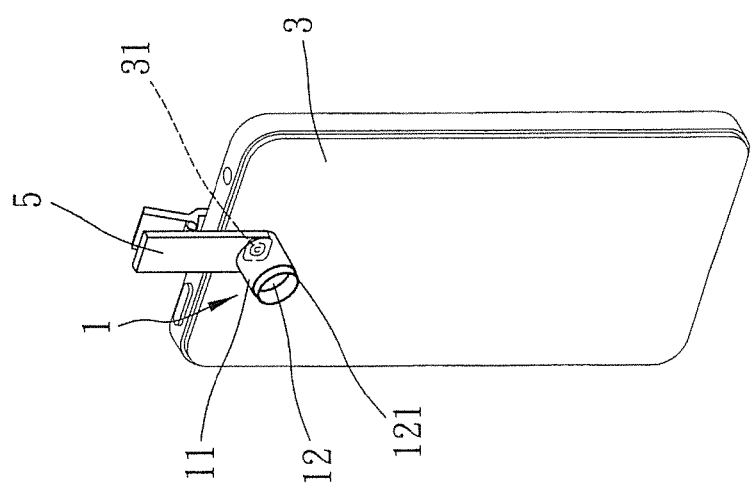
FIG. 9 is an elevational view of a barrel-based white balance filter fastened to a smart phone in accordance with a third embodiment of the present invention.

Referring to FIGS. 9 and 10, a barrel-based white balance filter in accordance with a third embodiment of the present invention is shown. The white balance unit (1) formed of the barrel (11) and the milky white or gray filter (12) having an annular rim (121) is mountable at the front side of a camera lens (31)(41) of a smart phone (3) or tablet computer (4).

When using the smart phone (3) or table computer (4) to take pictures under the manual white balance mode, the milky white or gray filter (12) is well protected by the barrel (11) against the radiation of vivid light or reflective light, enabling the manual white balance system of the smart phone (3) or tablet computer (4) to measure the average white balance value of the scene viewed. Further, the barrel-based white balance filter of this third embodiment comprises a fastening device (5) for securing the barrel (11) of the white balance unit (1) to the front side of the camera lens (31)(41) of the smart phone (3) or tablet computer (4).

Figure 11:
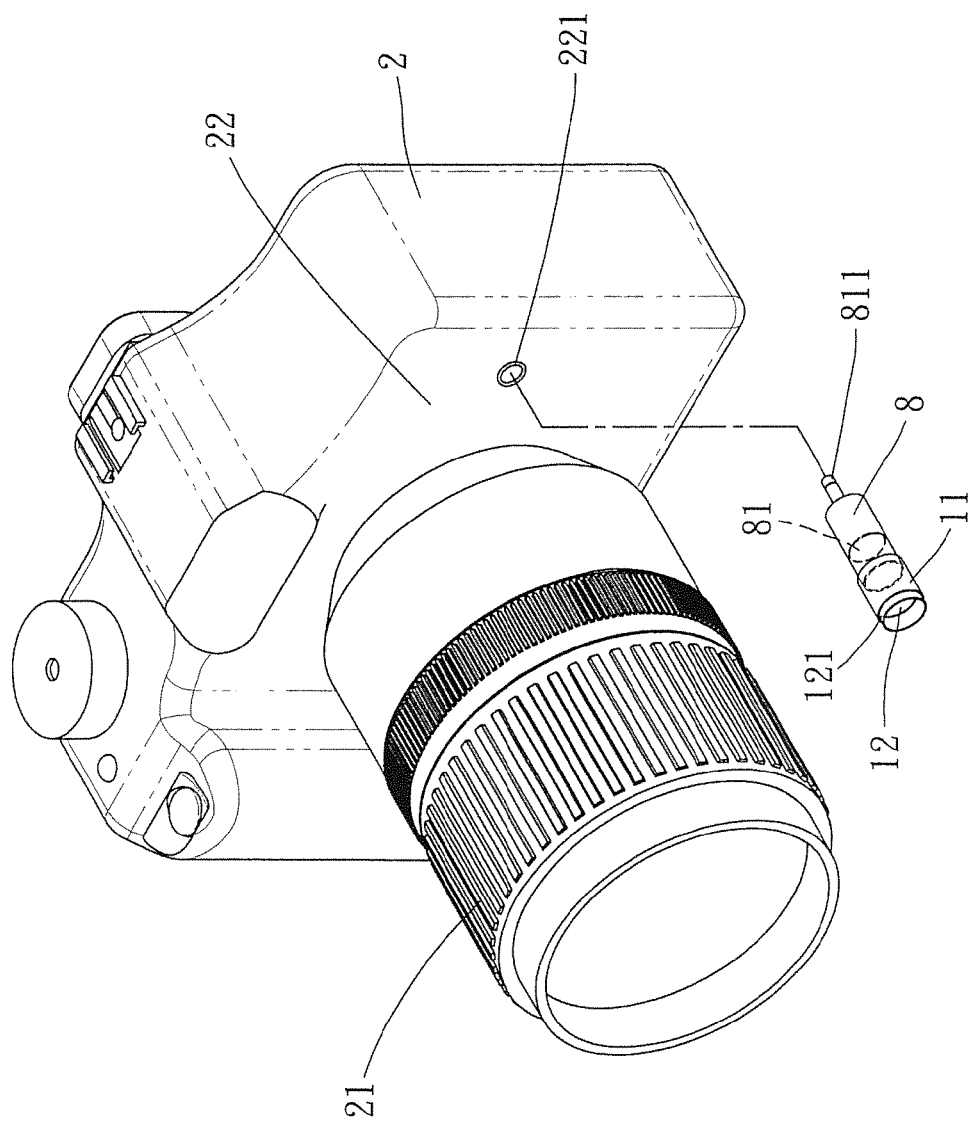
FIG. 11 illustrates a detachable type barrel-based white balance filter used in a camera in accordance with a fourth embodiment of the present invention.

Referring to FIG. 11, a barrel-based white balance filter in accordance with a fourth embodiment of the present invention is shown. This fourth embodiment is used in a detachable white balance color temperature measurement device (8). The detachable white balance color temperature measurement device (8) comprises a color temperature sensor (81) mounted in an outer shell thereof, and a plug (811) disposed outside the outer shell for transmitting power supply and signals. The plug (811) can be plugged into a mating jack (221) at the camera body (22) or camera lens (21) of a camera (2), video camera, smart phone (3) or tablet computer (4). The white balance unit (1) formed of a barrel (11) and a milky white or gray filter (12) having an annular rim (121) is mounted in the front side of the detachable white balance color temperature measurement device (8). When using the camera (2), video camera, smart phone (3) or table computer (4) to take pictures under the manual white balance mode, the milky white or gray filter (12) is well protected by the barrel (11) against the radiation of vivid light or reflective light, and the color temperature sensor (81) senses the color temperature, enabling the manual white balance system of the camera (2), video camera, smart phone (3) or tablet computer (4) to measure the average white balance value of the scene viewed.

Figure 12:
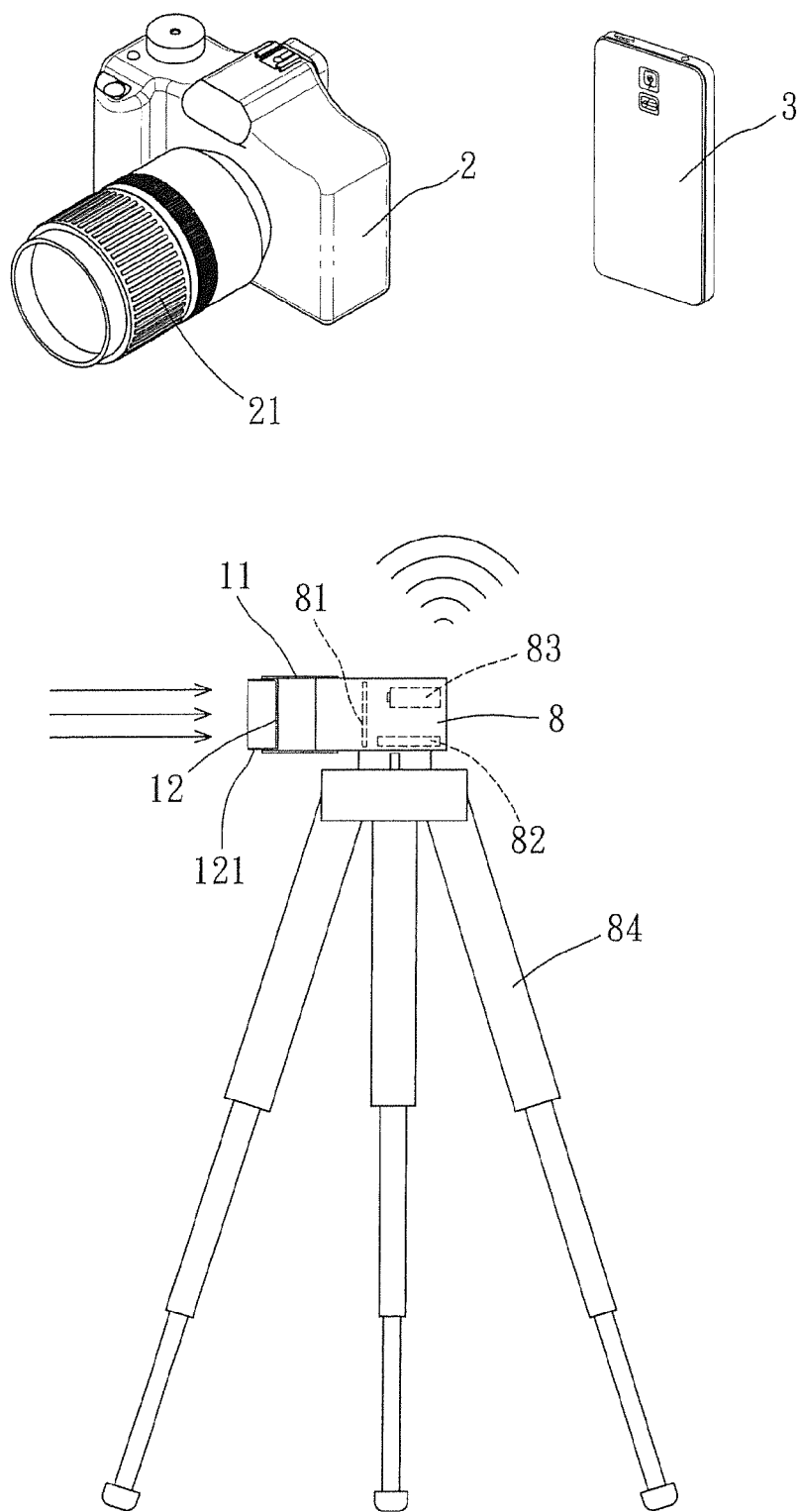
FIG. 12 illustrates the detachable type barrel-based white balance filter of the fourth embodiment of the present invention equipped with a wireless circuit and a battery and mounted at a camera tripod for wireless communication with a camera or smart phone.
Figure 13:
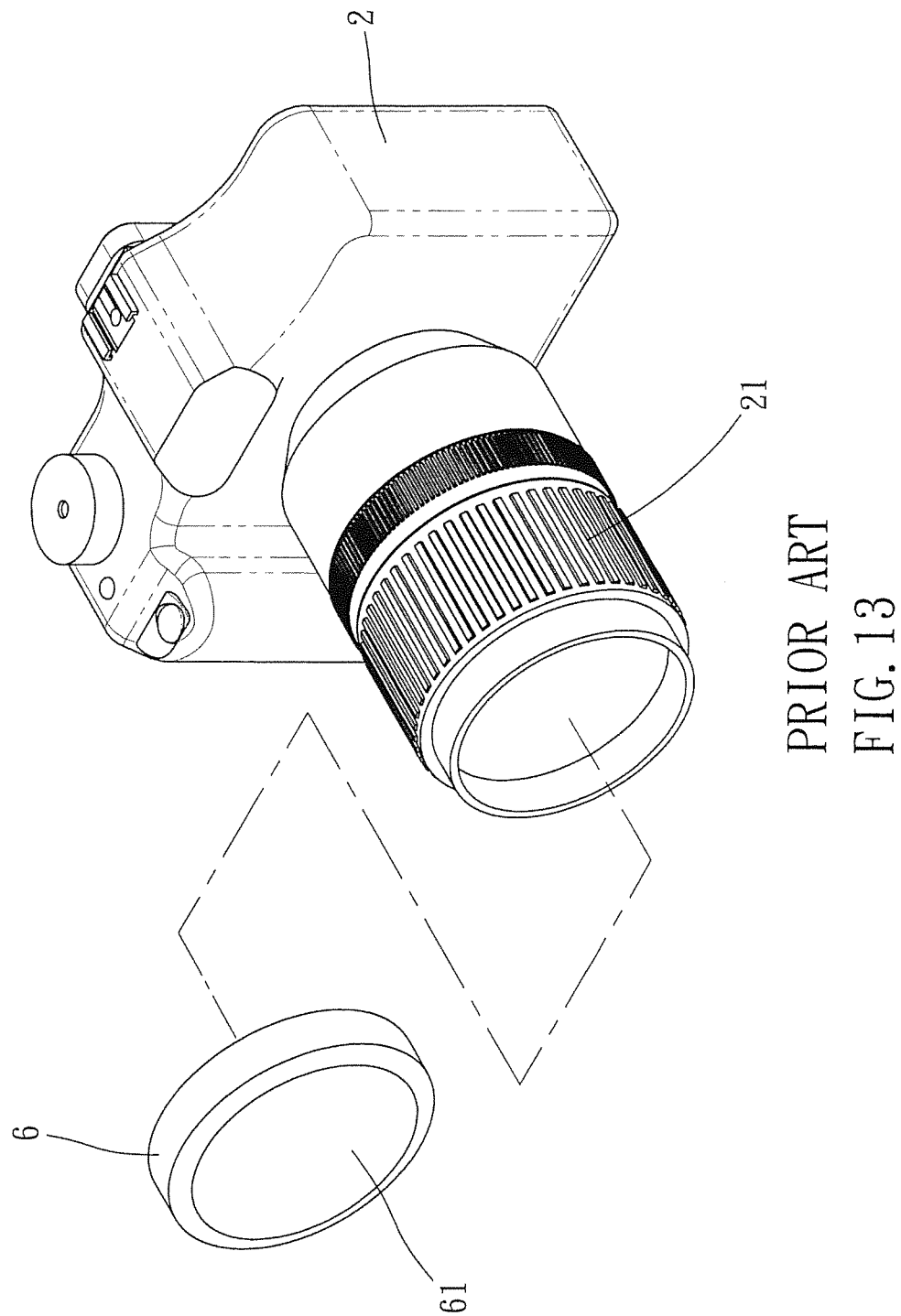
FIG. 13 illustrates a white balance device for use with a camera according to the prior art.
Figure 14:
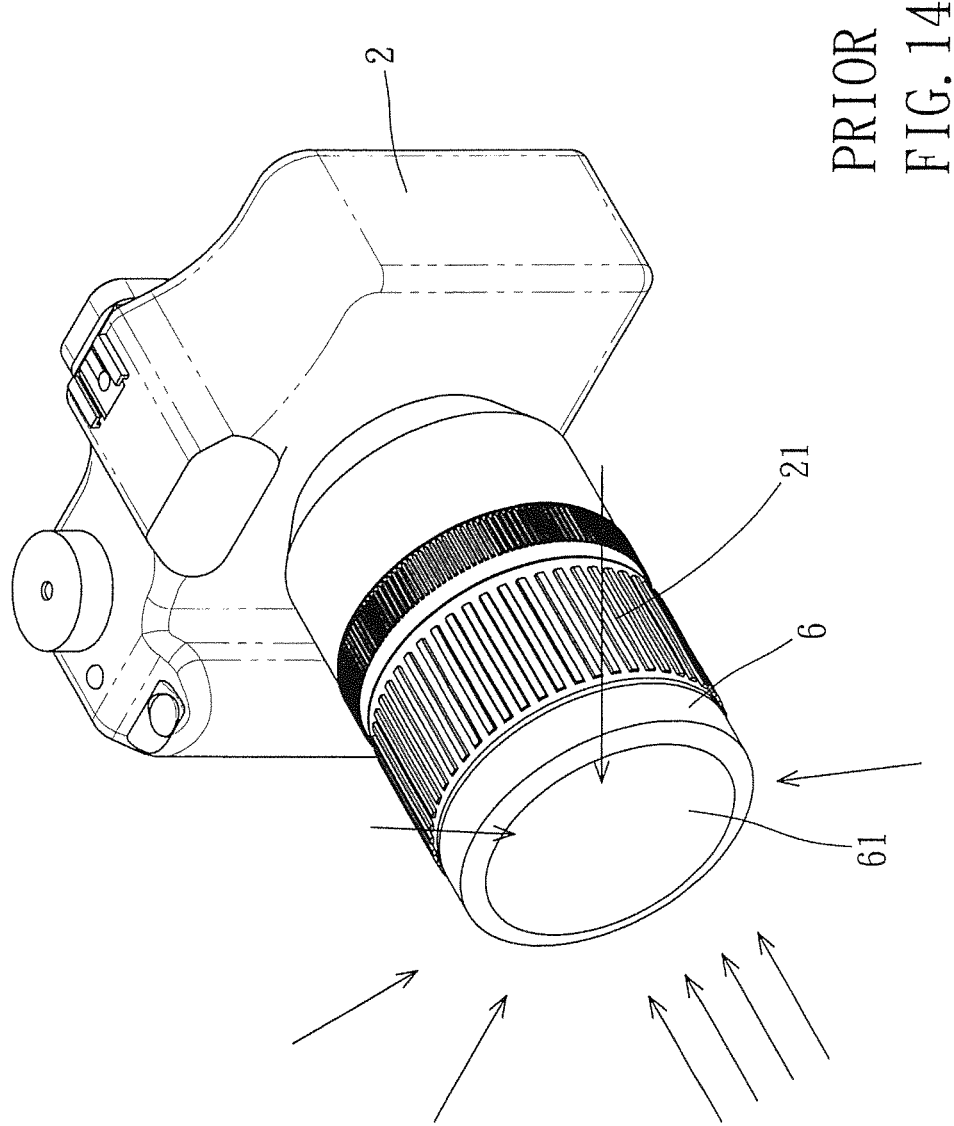
FIG. 14 corresponds to FIG. 13, illustrating the white balance device attached to the camera lens of the camera.
Figure 15:
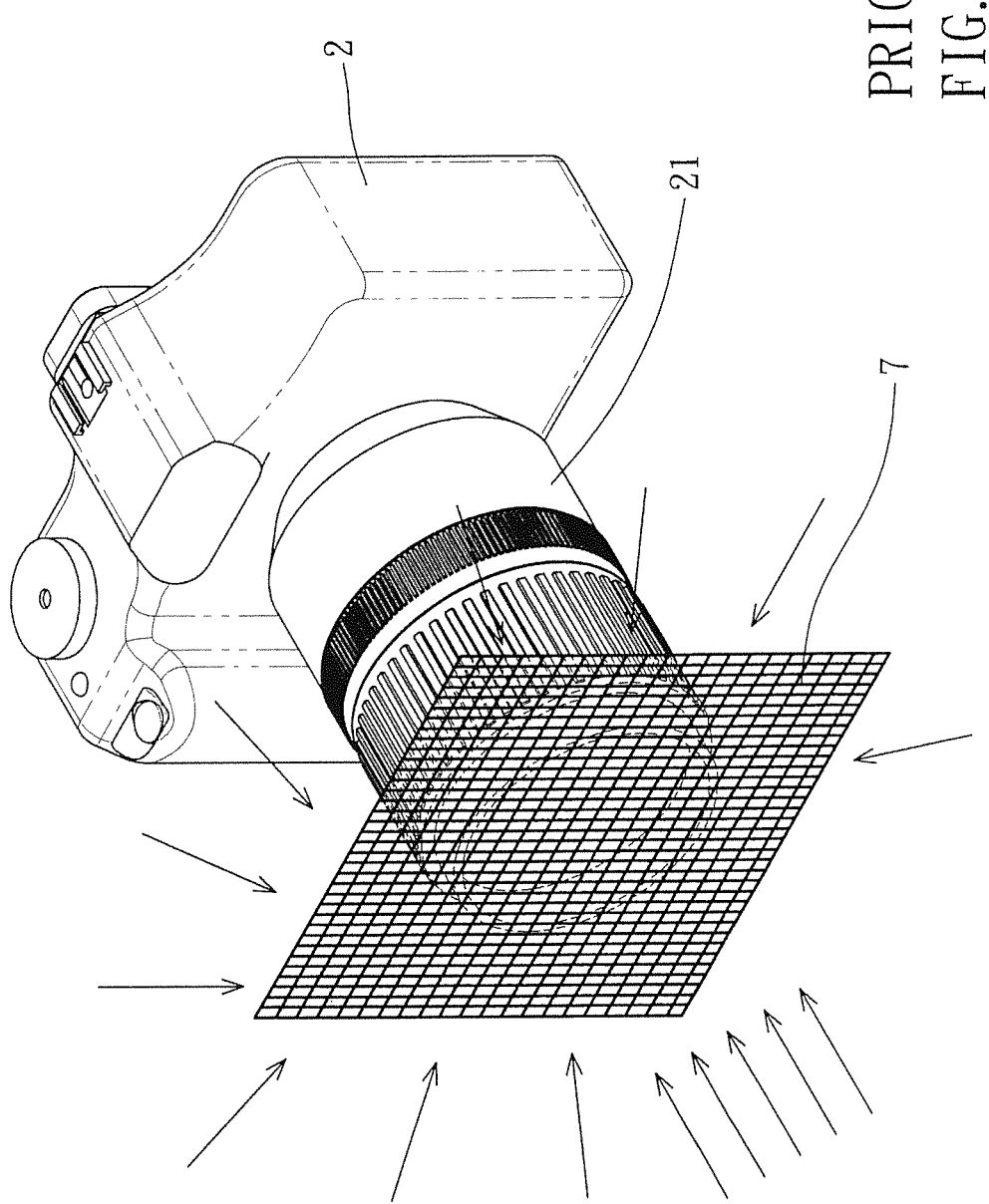
FIG. 15 illustrates the use of another prior art design of white balance device with a camera.

Further, a wireless circuit (82) and a battery (83) can be mounted in the detachable white balance color temperature measurement device (8). During application, the detachable white balance color temperature measurement device (8) is mounted on a tripod (84) for measuring the average white balance (color temperature) value of the scene and transmitting the measured average white balance (color temperature) value to a CPU (Central Processing Unit) of a camera (2), video camera, smart phone (3) or tablet computer (4) for processing through a white balance arithmetic process to get an accurate white valance (color temperature) value (see FIG. 12).

In conclusion, the invention provides a barrel-based white balance filter comprising a white balance unit that comprises an opaque barrel and a white balance component axially adjustably mounted in the opaque barrel. The invention uses the opaque barrel to isolate the color temperature beyond the camera scene, and allows adjustment of the proportion of the amount of the color temperature of the main light source using the light transmissive property of the white balance filter of the white balance unit, achieving the effect of increasing or reducing the average color temperature like the functioning of the eyelid to adjust the intraocular pressure subject to the brightness of the main light source so that the color is closer to the human eye visual sense and personal preferences.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A barrel-based white balance filter, comprising:
    a barrel prepared from an opaque material and attachable to a camera lens of a camera; and
    a white balance component including a milky white or gray filter and a milky white or gray annular rim axially extended from the periphery of said milky white or gray filter, said milky white or gray filter adjustably mounted in said barrel and axially movable relative to said barrel between an extended position and a fully received position, said milky white or gray annular rim being completely received within said barrel and protected by said opaque barrel against the radiation of vivid light or reflected light when said white balance component is in said fully received position.

2. The barrel-based white balance filter as claimed in claim 1, wherein said milky white or gray filter includes a six-star sword head protrusion located at the center thereof to assist camera lens focusing.

3. The barrel-based white balance filter as claimed in claim 1, wherein:
    said barrel includes a stop flange located at an orifice thereof; and
    said milky white or gray filter includes a stop flange located at a rear side thereof and stoppable against the stop flange at the orifice of said barrel to prohibit said milky white or gray filter from falling out of said barrel.

4. The barrel-based white balance filter as claimed in claim 1, wherein said milky white or gray filter is a flat glass filter.

5. A barrel-based white balance filter, comprising:
    a telescopic barrel prepared from an opaque material and including a plurality of barrel components, said barrel components coupled to one another and axially slidable relative to one another, said telescopic barrel being attachable to a camera lens of a camera directly or by means of an engagement thread thereof; and
    a white balance component including a milky white or gray filter and a milky white or gray annular rim axially extended from the periphery of said milky white or gray filter, said milky white or gray filter adjustably mounted in said telescopic barrel and axially slidably coupled to said telescopic barrel;
    wherein said barrel components and said milky white or gray filter each include two stop flanges respectively located at opposing front and rear sides of said components or filter and adapted to prohibit said barrel components and said milky white or gray filter from falling out of one another.

6. The barrel-based white balance filter as claimed in claim 1, further comprising a fastening device for securing said barrel to a front side of a camera lens of a camera, video camera, smart phone or tablet computer.

7. A barrel-based white balance filter, comprising:
    a barrel prepared from an opaque material and attachable to a camera directly or by means of an engagement thread thereof,
    a white balance component including a milky white or gray filter and a milky white or gray annular rim axially extended from the periphery of said milky white or gray filter, said milky white or gray filter adjustably mounted in said barrel and axially movable relative to said barrel between an extended position and a fully received position, said milky white or gray annular rim being completely received within said barrel and protected by said opaque barrel against the radiation of vivid light or reflected light when said white balance component is in said fully received position;
    an outer shell holding said barrel;

a color temperature sensor mounted in said outer shell; and
a plug electrically connected to said color temperature sensor and extended out of said outer shell and electrically detachably connectable to a jack at a camera body or camera lens of a camera, video camera, smart phone or tablet computer for transmitting power supply and signals.

* * * * *